United States Patent [19]

Booher

[11] Patent Number: 4,586,646

[45] Date of Patent: May 6, 1986

[54] BEAM FABRICATING DEVICE

[76] Inventor: Howard Booher, P.O. Box 277, Randolph, Ohio 44265

[21] Appl. No.: 742,766

[22] Filed: Jun. 10, 1985

[51] Int. Cl.$^4$ .................... B23K 37/04; B23P 11/02; B23P 17/02

[52] U.S. Cl. .................... 228/44.3; 228/4.1; 228/5.1; 228/15.1; 29/446; 29/155 R

[58] Field of Search .................... 29/155 R, 446; 228/44.3, 15.1, 5.1, 4.1, 6.1; 52/729

[56] References Cited

U.S. PATENT DOCUMENTS

| 3,066,394 | 12/1962 | Litzka | 29/155 R |
|---|---|---|---|
| 3,260,438 | 7/1966 | Bergantini | 228/6.1 |
| 3,283,464 | 11/1966 | Litzka | 29/155 R |
| 3,434,198 | 3/1969 | Bergantini | 29/155 R |
| 3,612,569 | 10/1971 | Marinelli | 29/155 R |

FOREIGN PATENT DOCUMENTS

| 2025822 | 1/1980 | United Kingdom | 228/6.1 |
|---|---|---|---|
| 659366 | 6/1979 | U.S.S.R. | 228/6.1 |

*Primary Examiner*—Nicholas P. Godici
*Assistant Examiner*—Samuel M. Heinrich
*Attorney, Agent, or Firm*—Harpman & Harpman

[57] ABSTRACT

An I-beam fabrication device that positions and aligns two distinct T-shaped beam portions together in a predetermined longitudinally curved configuration and automatically welds the beam portions into a single integral prestressed I-beam capable of increased load capacity.

5 Claims, 11 Drawing Figures

BEAM FABRICATING DEVICE

BACKGROUND OF THE INVENTION

1. Technical Field

I-beams of this type are used in the construction of trailers wherein a greater load capacity is desired. The I-beam has a longitudinally curved configuration to offset a given amount of deflection under load due to their great length.

2. Description of the Prior Art

Prior art construction of one-piece aluminum I-beams of the size and length required was technically difficult due to the present limitations of aluminum extrusion technology. A method of curved I-beam manufacture is disclosed in applicant's own presently pending patent application, Ser. No. 06/591,930 filed Mar. 21, 1984 disclosing the basic method of fabrication but not the apparatus.

SUMMARY OF THE INVENTION

An I-beam fabrication device that positions and aligns two distinct beam portions together in a predetermined longitudinally curved configuration and automatically welds the beam portions into a single integral prestressed I-beam capable of increased load capacity.

DESCRIPTION OF THE PREFERRED EMBODIMENT

Figure 3:
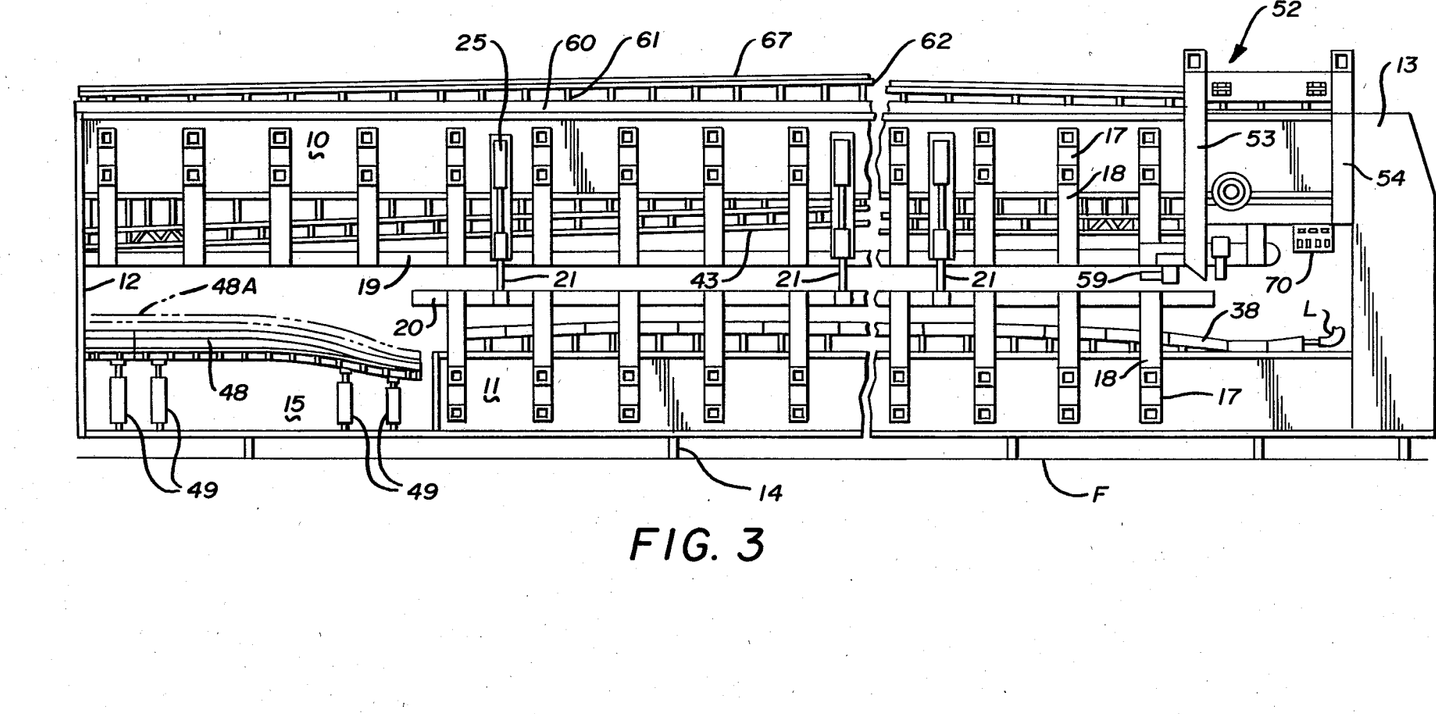
FIG. 3 is a right side elevation of the beam fabrication device.

An I-beam fabrication device can be seen in FIGS. 1-5 of the drawings comprising a pair of vertically spaced and aligned support I-beams 10 and 11 with said support I-beams 10 and 11 extending between and secured to end supports 12 and 13. The support I-beam 11 is secured to a foundation F via a foundation support 14 and has an end portion 15 of reduced height as best seen in FIG. 3 of the drawings.

A plurality of tubular brackets 16 are secured to one side of said support I-beams 10 and 11 respectively in longitudinally spaced relation to one another and in oppositely disposed relation on said I-beams. Each of said tubular brackets 16 is comprised of a first tube portion 17 secured to its respective I-beam and a second tube portion 18 extending from said first portion 17.

Referring to FIG. 3 of the drawings, it will be seen that the tubular brackets 16 do not extend from the end portion 15 of the support I-beam 11. Guide rails 19 and 20 are secured to the free ends of the tubular brackets 16 extending from the support I-beams 10 and 11 respectively. The guide rails 19 and 20 are aligned with one another in spaced vertical relation.

Figure 4:
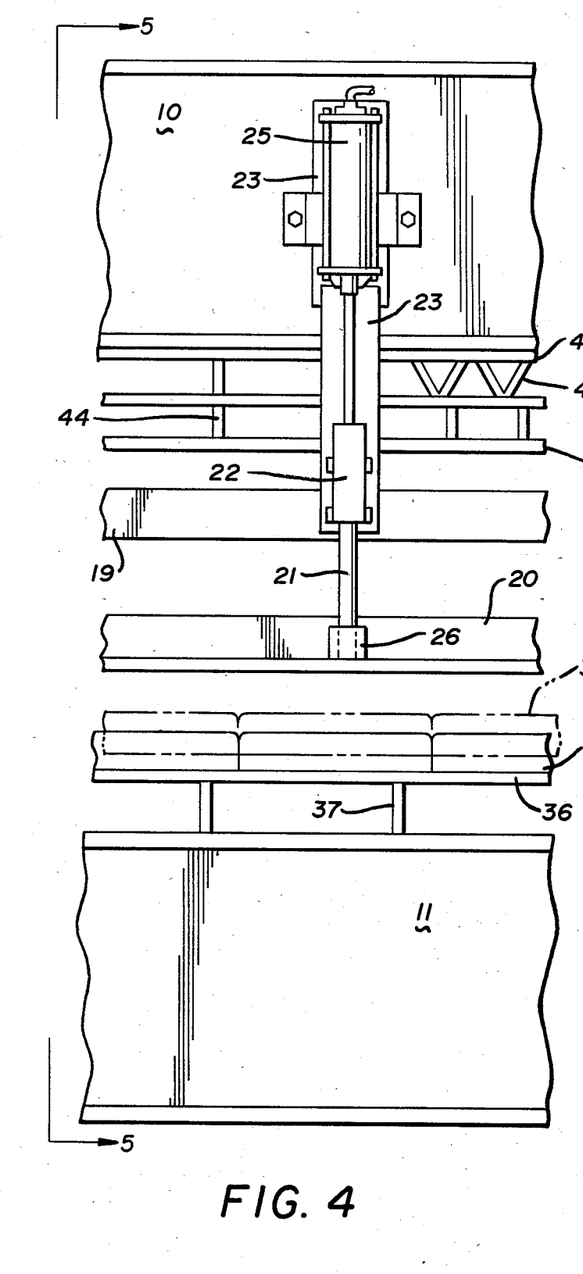
FIG. 4 is an enlarged portion of an alignment pin seen in FIG. 3 of the drawings.
Figure 5:
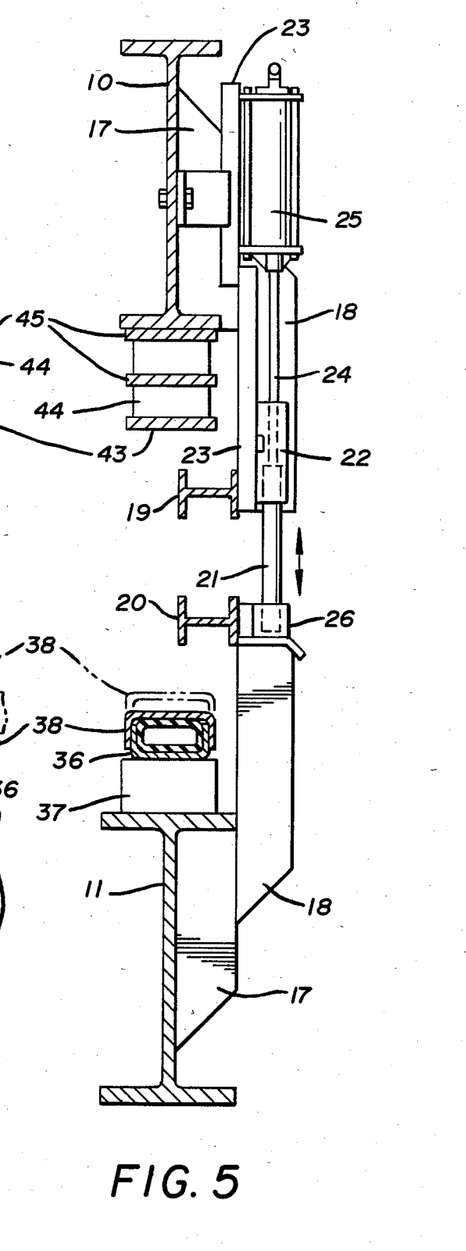
FIG. 5 is a partial cross section on lines 5—5 of FIG. 4.

A series of alignment pins 21 are slidably positioned between said support I-beams 10 and 11. Each alignment pin 21 extends from a guide cylinder 22 secured to a mounting plate 23 extending from and secured to said support I-beam 10 and said guide rail 19. A piston rod 24 of a hydraulic piston and cylinder assembly 25 drives the alignment pin 21 into and out of engagement with a socket 26 secured to the guide rail 20 as best seen in FIGS. 4 and 5 of the drawings. It will be seen that the alignment pins 21 provide critical vertical alignment of the guide rails 19 and 20 during the beam fabrication, as will be described.

Figures 1, 2:
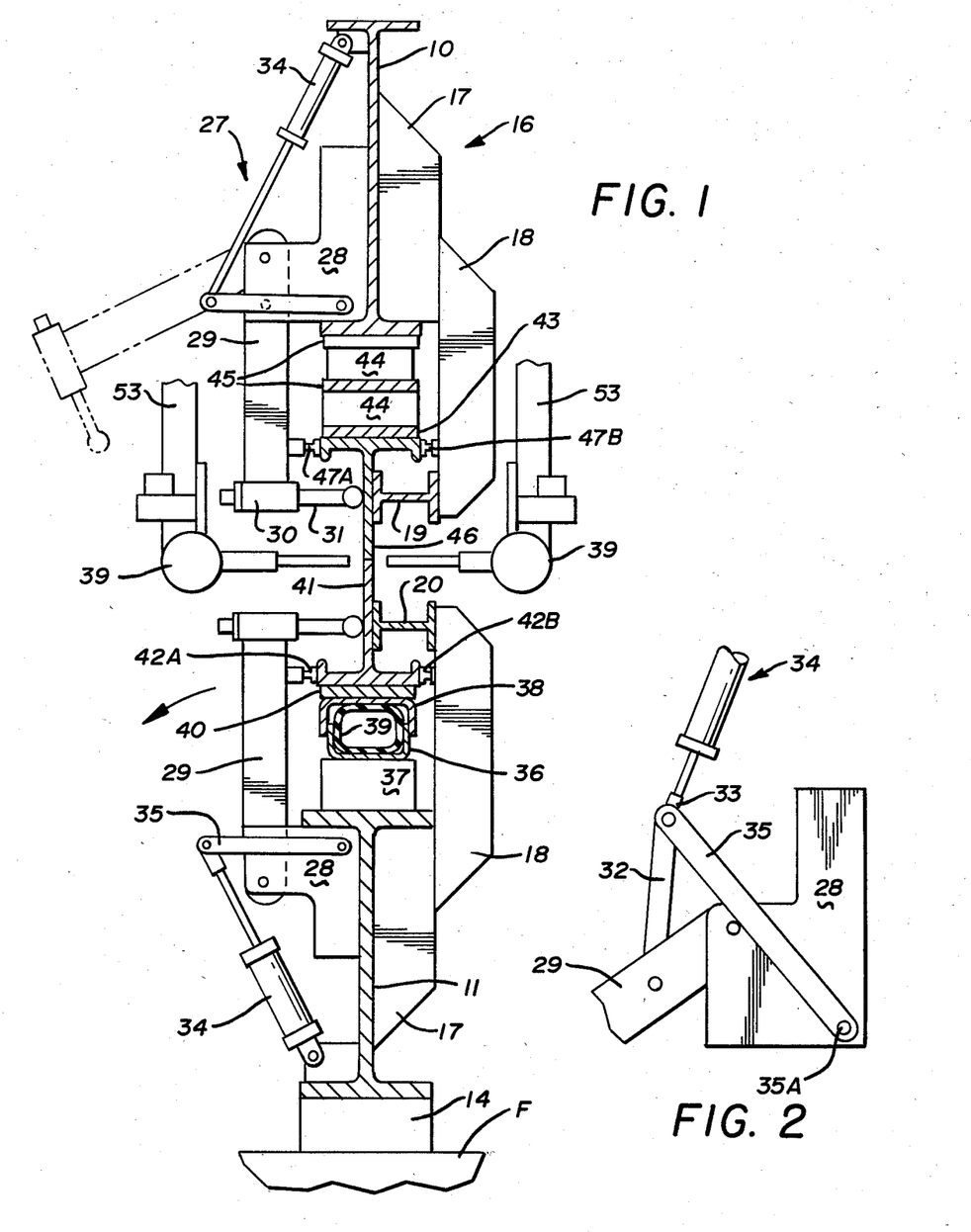
FIG. 1 is a cross sectional view of a beam fabrication device with the beam portions held in aligned position for welding.
FIG. 2 is an enlarged view of a portion of the beam holding arm seen in FIG. 1.
Figure 6:
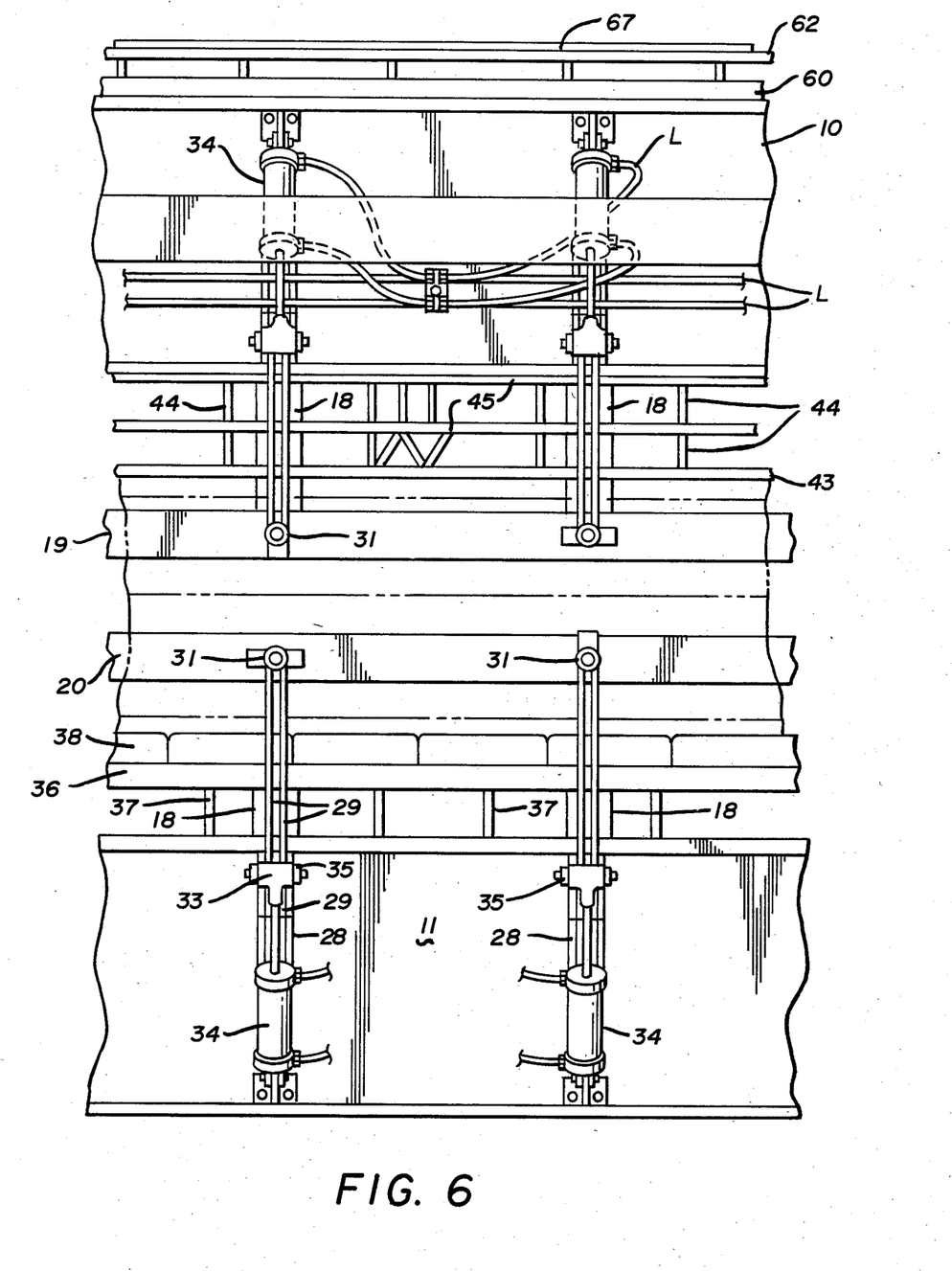
FIG. 6 is an enlarged portion of the left side of the beam fabrication device.

Referring now to FIGS. 1, 2 and 6 of the drawings, a plurality of longitudinally spaced arm assemblies 27 are positioned along the other side of said support I-beams 10 and 11 in aligned oppositely disposed relation with said tubular brackets 16. Each of said arm assemblies 27 is comprised of a pair of spaced L-shaped pivot plates 28 secured to and extending outwardly from said support I-beams. A holding arm 29 is pivotally secured between the pivot plates 28 and extends outwardly therefrom. A journaled fitting 30 is secured to the free end of the holding arm 29 with a T-shaped rod 31 extending therefrom. A control lever 32 is pivotally secured between the holding arm 29 inwardly from its pivoted end and a piston rod coupler 33 on the end of a piston rod and cylinder assembly 34. A pair of secondary control levers 35 are pivotally secured to said pivot plates at 35A and the piston rod coupler 33.

In operation with the holding arm 29 in vertical position as shown in FIG. 1 of the drawings, the piston and cylinder assembly 34 is connected to a pressurized fluid source via supply lines L as is well understood in the art. The piston rod of the piston and cylinder assembly 34 would retract pulling the control levers 32 and 35, raising the holding arm 29 in an arcuate path as shown in FIG. 2 of the drawings, and in broken lines in FIG. 1 of the drawings. The holding arms 29 opposite the support I-beam 11 extend downwardly from their respective assemblies while the holding arms 29 opposite the support I-beam 10 extend upwardly from their assemblies. A work piece support platform is positioned on the upper surface of the support I-beam 10 and is comprised of an elongated U-shaped channel member 36 that is spaced in vertical relation to said support I-beam 10 by a plurality of flat rectangular legs 37 as best seen in FIGS. 1, 4 and 6 of the drawings. The legs 37 vary in height with the ones nearer the end support 13 decreasing in height. A number of inverted U-shaped channel members 38 are positioned in end to end relation over the elongated U-shaped channel member 36 with the inverted channel member 38 having a greater cross sectional interior dimension than that of the outside cross sectional diameter of said U-shaped channel member 36. The overlapping channel members 36 and 38 define an area therebetween in which a high pressure flexible hose 39 is positioned along the entire length of said channel member 36. A pressure plate 40 extends over the channel members the length thereof and defines a continuous unbroken surface for the placement of an inverted T-shaped beam portion 41 best seen in FIGS. 1 and 10 of the drawings.

The inverted T-shaped beam portion 41 is held in aligned position against the guide rails 20 by the T-shaped rods 31 extending from the holding arms 29 and by oppositely disposed stop pins 42A and 42B secured to the holding arms facing the beam portion 41 and to the second tube portion 18. The stop pins 42A and 42B are adjustable to adapt to a variety of beam portion widths.

A work piece forming plate 43 is suspended from the lower surface of the support I-beam 10 by a multiple spacer and plate assembly having a plurality of spacers 44 positioned between plates 45 with the plate 43 engaging a secondary T-shaped beam portion 46 positioned in aligned relationship with said inverted T-shaped beam portion 41. The secondary T-shaped beam portion 46 is held in alignment by its respective holding arms 29 and stop pins 47A and 47B identical in configuration and mountings of stop pins 42A and 42B as hereinbefore described.

Referring to FIG. 3 of the drawings, a convex curve is defined by the plates 43 and 45 by the gradually increasing of the vertical height of spacers 44 along the midportion of the plate 43. The end portion 15 of the support I-beam 11 has a movable upper guide 48 having a curved configuration. Pairs of piston and cylinder assemblies 49 are pivotally secured between the movable upper guide 48 and the end portion 15 adjacent either end thereof and on either side of said end portion. The piston and cylinder assemblies 49 are arranged to elevate the upper guide 48 into a position indicated by broken lines at 48A bending an end portion 50 of the beam portion 41 seen in FIGS. 10 and 11 of the drawings upwardly against a depending web portion 51 of the secondary T-shaped beam portion 46.

Referring now to FIGS. 3 and 7-9 of the drawings, a welding carriage assembly 52 can be seen movably positioned along the support I-beam 10. The welding carriage assembly comprises a tubular support frame having pairs of oppositely disposed vertical tubular members 53 and 54, interconnecting tubular members 53A and 54A between their upper ends. Pairs of oppositely disposed, vertically spaced, horizontally extending tubular members 55 and 56 extend between said vertical tubular members 53 and 54 respectively defining an inverted generally U-shaped carriage configuration that is supported on a carriage guide assembly 57 by a guide wheel assembly 58, best seen in FIG. 9 of the drawings. The welding carriage 52 has a pair of oppositely disposed welding guns 59, each of which is secured to the vertical tubular members 53 adjacent their free ends.

Figure 9:
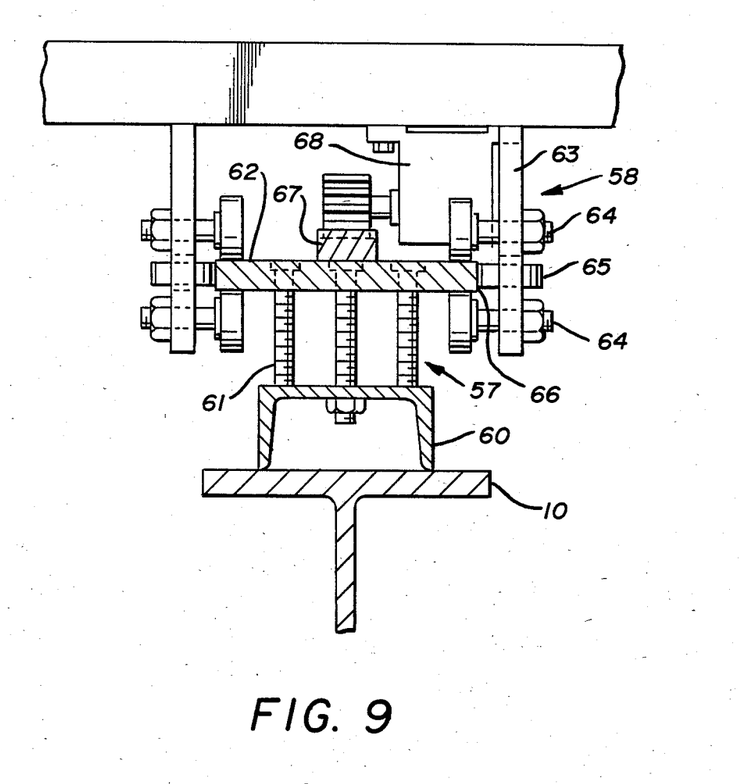
FIG. 9 is an enlarged portion of the welding carriage, guide and transport apparatus.

The carriage guide assembly 57 is comprised of a track support channel 60 on top of the support I-beam 10. A plurality of longitudinally spaced, vertically adjustable track support bolts 61 secure and vertically space a track member 62 that extends the length of the support I-beam 10. The track support bolts 61 are adjusted to curve the track member 62 to correspond to the desired curve of the beam to be fabricated. The guide wheel assembly 58 is comprised of multiple wheel sets, each of which has a main support bracket 63 with a pair of vertically spaced axle wheel and bearing assemblies 64 positioned thereon engaging either side of the track 62. A secondary axle wheel and bearing assembly 65 is positioned horizontally within an opening in the support bracket 63 and is aligned to engage an edge 66 of the track 60 as best seen in FIG. 9 of the drawings. A rack 67 is centered transversely on the upper surface of said track 62 extending the full length thereof. A right angular gear motor assembly 68 is secured to the welding carriage assembly and engages the rack 67 as will be well understood by those skilled in the art moving the same along the carriage guide assembly at a predetermined rate.

Figure 7:
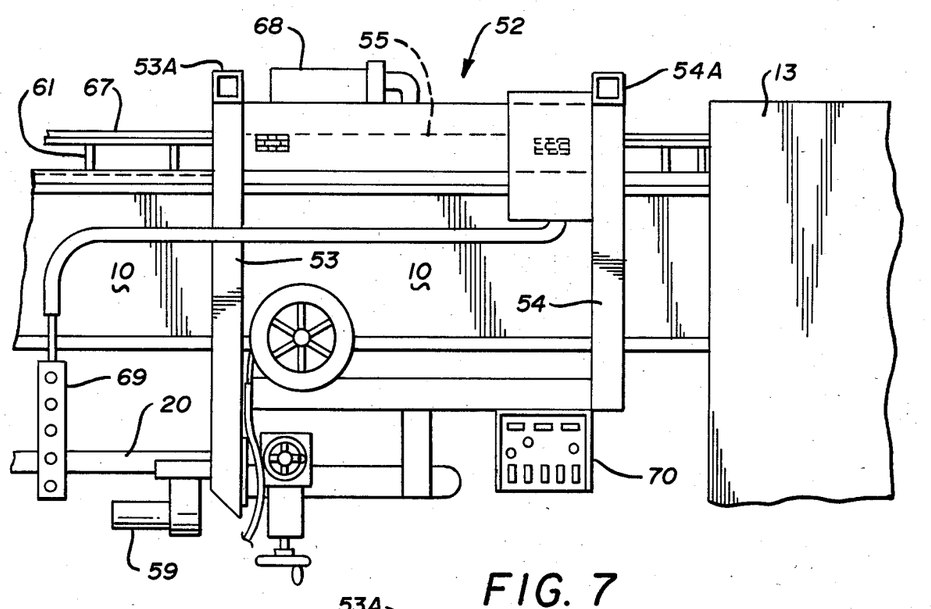
FIG. 7 is a side plan view of a welding carriage on the beam fabrication device.
Figure 8:
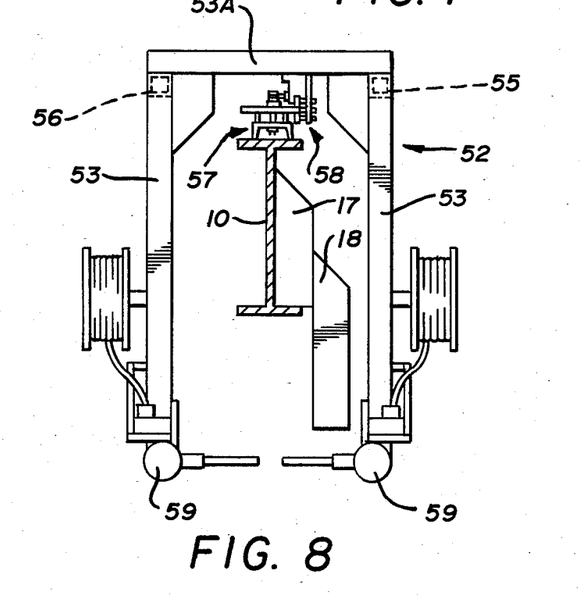
FIG. 8 is an end view of the welding carriage in FIG. 7 with portions broken away.

Referring now to FIG. 7 of the drawings, welding carriage controls 69 and a welding gun controller 70 can be seen that when activated moves the welding carriage assembly 52 along the length of the track 62 advancing the welding guns 59 which are positioned to align at the junction of the T-shaped beam portions 41 and 46 as best seen in FIG. 1 of the drawings.

Figure 10:
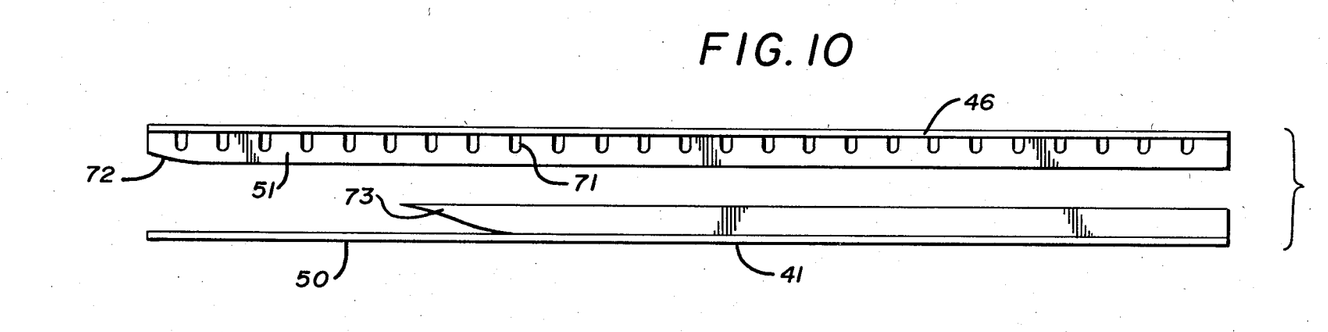
FIG. 10 is a side plan view of two distinct beam portions before joining.
Figure 11:
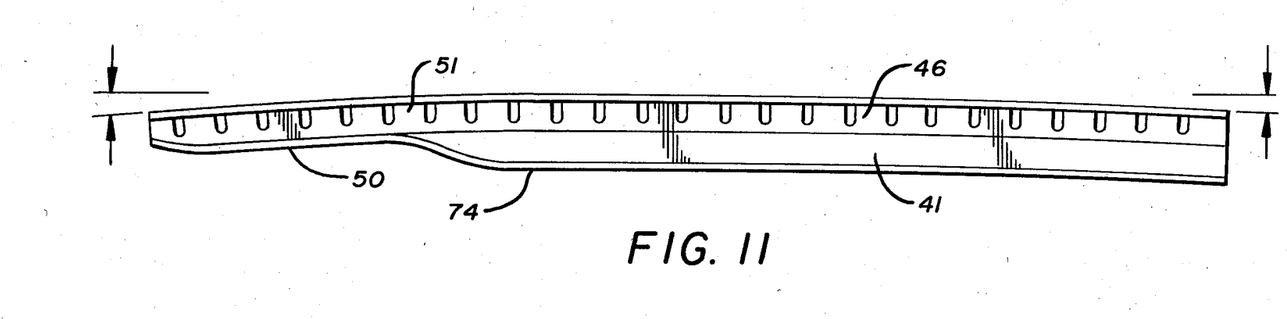
FIG. 11 is a side plan view of a completed longitudinally prestressed curved I-beam.

In operation, the holding arms 29 are opened as shown in broken lines in FIG. 1 of the drawings. The T-shaped beam portions 41 and 46 are prepared as shown in FIG. 10 of the drawings with the beam portion 46 being punched at 71 and cutaway at 72. The beam portion 41 is inverted with a large section of its web cutaway at 73. The beam portion 46 is loaded into the device first and the holding arms 29 opposite said support I-beam 10 are closed holding the beam portion 46 against the guide rail 19 and stops 47A and 47B. The other beam portion 41 is placed into the device resting on the pressure plate 40 and the holding arms 29 opposite said support I-beam 11 are closed. The high pressure hose 39 is connected to a compressed air source and pressurized. The expanding hose 39 forces the multiple U-shaped channel members 38 and the pressure plate 40 upwardly against the base of the beam portion 41 moving the same for engagement with the beam portion 46 bending both beam portions to the convex curve defined by the plates 43 and 45.

The movable upper guide 48 of the support I-beam 11 portion 15 is moved upwardly by the hydraulic piston and cylinder assemblies 49 as shown in broken lines in FIG. 3 of the drawings at 48A against the end portion 50 of the beam portion 41 bending the same against the beam portion 46.

The welding carriage assembly 52 is activated with the welding guns 59 tracking along the seam between the abutting beam portions 41 and 46 welding the same simultaneously. As the welding carriage assembly 52 moves along the guide track 62 from adjacent the end support 13 to the end support 12. The alignment pins 21 are retracted individually as the welding carriage approaches each one. Once the welding guns 59 pass the pin position, the pins 21 are re-engaged. The welding carriage 52 is then moved back to the beginning of the portion 50, the weld guns are repositioned to weld the seam between the end portion 50 and a web cutaway at 73. The end portion 50 opposite the cutaway at 72 of the beam portion 46 is bent upwardly and is welded in place forming a complete beam 74 seen in FIG. 11 of the drawings.

It will be apparent from the above description that the completed beam 74 is then removed from the device by depressurization of the hose 39 and opening of the holding arms 29 in the reverse order of engagement as hereinbefore described.

The completed beam 74 having been fabricated in a prestressed curved configuration is capable of increased load performance when used in a trailer construction which requires a relatively long beam span. By prestressing the completed beam 74 in a curved configuration the greater deflection characteristics of aluminum I-beams compared to steel beams of a like size is overcome and increased trailer performance is obtained with durability and weight savings advantage of aluminum construction.

Thus it will be seen that a new and useful beam fabrication device has been illustrated and described and it will be apparent to those skilled in the art that various changes and modifications may be made therein without departing from the spirit of the invention and having thus described my invention,

What I claim is:

1. An I-beam fabrication device used to hold and weld two distinct T-shaped beam portions in a pre-shaped curved configuration, the beam fabricating device comprises a pair of vertically spaced support members defining a beam receiving area therebetween, a plurality of movable arm assemblies positioned on each of the vertical spaced support members, a plurality of guide rail support brackets secured to each of said vertical spaced support members, guide rails on said support brackets, means for activating said arm assemblies into engagement with a beam portion to clamp said beam portion against said guide rails, means for defining a predetermined curved configuration of said beam portions and means for supporting and bending said beam portions into said predetermined curved configuration, means for maintaining vertical alignment between said guide rails, means for adjustably positioning said beam portions within said receiving area to adapt to a variety of beam portion widths, and welding means movably positioned on one of said vertical support members.

2. The I-beam fabricating device of claim 1 wherein means for supporting and bending said beam portion comprises a work piece support platform having overlapping oppositely disposed U-shaped channel members, and expansion means within said channel members for expanding the same.

3. The I-beam fabrication device of claim 1 wherein said means for defining a predetermined curved configuration comprises a work piece form plate secured to a spacer and plate assembly.

4. The I-beam fabrication device of claim 1 wherein said means for maintaining alignment between said guide rails comprises alignment pins movably positioned between the vertical spaced support members.

5. The I-beam fabrication device of claim 1 wherein said welding means comprising a welding carriage positioned along one of said vertical spaced support members.

* * * * *